United States Patent
Elnozahy

(10) Patent No.: US 6,195,743 B1
(45) Date of Patent: Feb. 27, 2001

(54) METHOD AND SYSTEM FOR COMPRESSING REDUCED INSTRUCTION SET COMPUTER (RISC) EXECUTABLE CODE THROUGH INSTRUCTION SET EXPANSION

(75) Inventor: Elmootazbellah Elnozahy, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/239,260

(22) Filed: Jan. 29, 1999

(51) Int. Cl.[7] ........................................ G06F 5/00
(52) U.S. Cl. ................................ 712/42; 717/9
(58) Field of Search .............. 712/209, 41, 42, 712/226; 717/9

(56) References Cited

U.S. PATENT DOCUMENTS

| | | | |
|---|---|---|---|
| 5,680,600 | * 10/1997 | Childers | 712/245 |
| 5,946,489 | * 8/1999 | Yellin | 717/5 |
| 6,005,503 | * 12/1999 | Burrows | 371/67 |

OTHER PUBLICATIONS

Tong Lai Yu, "Data Compression for PC Software Distribution," Software Practice and Experience, vol. 26(11), pp. 1181–1195, Nov. 1996.

Christopher Fraser et al, "Custom Instruction Sets for Code Compression," pp. 1–9, Oct. 19, 1995.

Michael Franz et al., "Slim Binaries," Department of Information and Computer Science, University of California at Irvine, pp. 1–16.

Jens Ernst et al., "Code Compression," University of Arizona, pp. 358–365.

* cited by examiner

Primary Examiner—Eric Coleman
(74) Attorney, Agent, or Firm—Casimer K. Salys; Felsman, Bradley, Vaden, Gunter & Dillon, LLP

(57) ABSTRACT

A compression scheme is disclosed for program executables that run on Reduced Instruction Set Computer (RISC) processors, such as the PowerPC architecture. The RISC instruction set is expanded by adding opcodes to produce code that facilitates the removal of redundant fields. To compress a program, a compressor engine rewrites the executable using the new expanded instruction set. Next, a filter is applied to remove the redundant fields from the expanded instructions. A conventional compression technique such as Huffman encoding is then applied on the resulting code.

20 Claims, 4 Drawing Sheets

METHOD AND SYSTEM FOR COMPRESSING REDUCED INSTRUCTION SET COMPUTER (RISC) EXECUTABLE CODE THROUGH INSTRUCTION SET EXPANSION

RELATED CO-PENDING APPLICATION

This application relates to co-pending applications, entitled "METHOD AND SYSTEM FOR COMPRESSING REDUCED INSTRUCTION SET COMPUTER (RISC) EXECUTABLE CODE" Ser. No. 09239259 (IBM Docket No. AT9-98-437), "METHOD AND SYSTEM FOR CLUSTERING REDUCED INSTRUCTION SET COMPUTER (RISC) EXECUTABLE CODE FOR COMPRESSION" Ser. No. 09/23926 (IBM Docket No. AT9-98-438), and "METHOD AND SYSTEM FOR SCOPE-BASED COMPRESSION OF REGISTER AND LITERAL ENCODING IN A REDUCED INSTRUCTION SET COMPUTER (RISC)" Ser. No. 09/239258 (IBM Docket No. AT9-98-436), all filed of even date herewith and assigned to the assignee herein named, the subject matter of each of which is incorporated herein by reference.

BACKGROUND OF THE INVENTION

1. Technical Field

The present invention relates to a method and system for compressing data in general and in particular to a method and system for compressing executable code. Still more particularly, the present invention relates to a method and system for compressing executable code in the context of Reduced Instruction Set Computer (RISC) architectures.

2. Description of the Prior Art

Reduced Instruction Set Computer (RISC) architectures simplify processor and compiler design by making all instructions have the same size and follow a few simple formats. A price to pay for these advantages is the large size of executable program code written using these instruction sets. The large code size reduces instruction cache effectiveness and utilization of memory resources. It also increases program-loading time when code is shipped over in a network environment or retrieved from a slow mechanical device like a disk.

Currently, network computers, embedded controllers, set-top boxes, hand-held devices and the like receive executables over a network or possibly through slow phone links or communication channels. Additionally, these devices may have very limited memory capacity that make large programs not fit in the available memory to run on the device. Therefore, for devices using RISC processors to be competitive in the market place, they may require highly efficient code compression that mitigates the disadvantage of large executable sizes.

Executable code written for RISC processors has traditionally been difficult to compress. Therefore there is a need for compressing instructions in a reduced instruction set computer (RISC) architecture such as the PowerPC family owned by International Business Machines. Traditional compressors in the prior art treat the instructions in a program as a stream of bits, and try to find patterns within this stream to help construct a more compact presentation of the program (e.g. Ziv-Lempel compression, Huffman encoding, etc.). However, RISC instructions often contain redundant fields. Redundant fields pose two problems. They pollute the compression model that a traditional compressor builds as it compresses the data, and therefore it will produce lower quality compression. Another problem with redundant fields is that they do not carry any information, yet a traditional compressor needs to generate code for them. The compressed code, however small it may be, does not convey any information. It one instead exploits the semantics of the instructions, a better solution is to eliminate the redundant fields so that the compressor does not have to generate code for them. These redundant fields then can be reconstructed during decompression in a straightforward manner. Therefore a need exists for a technique of identifying redundancy in RISC instructions and utilizing this information with commercial compression methods to yield better compression results. The present invention solves this problem by presenting a technique in a novel and unique manner, which is not previously known in the art.

SUMMARY OF THE INVENTION

In view of the foregoing, it is therefore an object of the present invention to provide an improved method and system for compressing executable code in the context of RISC processors.

It is another object of the present invention to provide an improved method and system to expand a RISC instruction set by exploiting the semantics of existing instructions and designing additional instructions that have no redundancy.

It is yet another object of the present invention to provide an improved method and system for compressing executable code in the context of RISC processors by rewriting a program using an expanded instruction set designed specifically to have little or no redundancy.

In accordance with a method and system of the present invention, a compression scheme for program executables that run in a reduced instruction set computer (RISC) architecture such as the PowerPC is disclosed. The method and system add opcodes to the RISC instruction set, producing instructions that have no redundant fields. The program is then rewritten using this new expanded instruction set, replacing many instructions from the original set that contain redundant fields with new instructions that contain no redundancy. A conventional compression technique such as Huffman encoding is then applied on the resulting code to produce better compression ratio than if it were to operate on the code written in the unexpanded instruction set.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
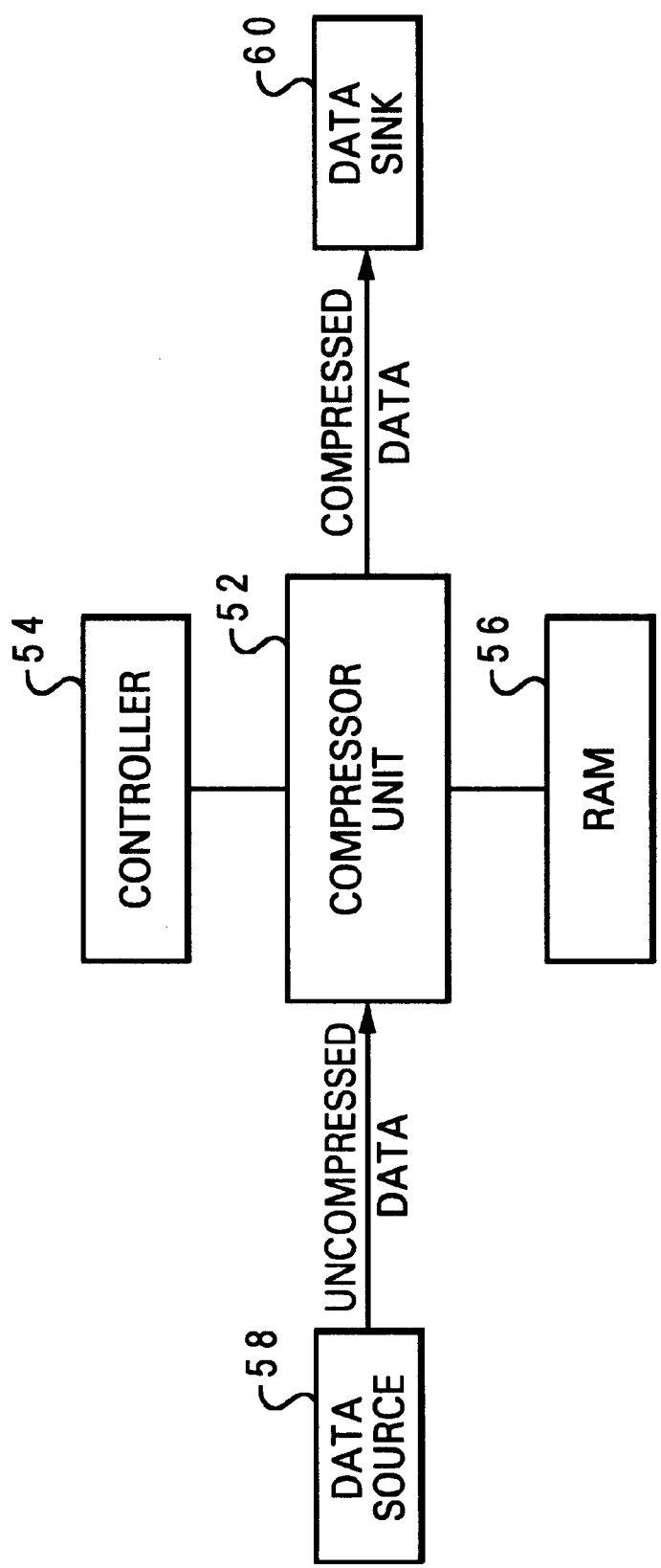
FIG. 1 is a block diagram of a compressor unit in which a preferred embodiment of the present invention may be incorporated.

Those skilled in the art may appreciate that the present invention can be implemented in hardware or software. With reference now to the figures and in particular with reference to FIG. 1, there is depicted a block diagram of a data compressor unit in which a preferred embodiment of the present invention may be incorporated. As shown, compressor unit 52 is coupled to a controller 54 and a random-access memory (RAM) 56. The controller 54 contains the permanent logic of the compressor in the form of non-volatile memory. This logic contains a specification and description of an expanded instruction set that the compressor uses to rewrite the executable program code, in accordance with the preferred embodiment of the present invention. During operation, compressor unit 52 receives from a data source 58 an uncompressed stream representing the executable program written in the unexpanded RISC instruction set. After rewriting the program using an expanded instruction set in accordance with the preferred embodiment of the present invention, compressor 52 uses a traditional compression algorithm such as Huffman encoding to compress the rewritten program, and then transmits the compressed data stream to a data sink 60. The data sink 60 could be a storage device or a communication link.

The method and system for rewriting the program executables using an expanded instruction set includes a one-time step, in which the base RISC instruction set is expanded with additional instructions. These instructions are encoded to contain no redundancy, and are meant to "replace" instruction patterns from the base architecture that are encoded with redundant fields. The design of these additional instructions exploits the formats of the instructions in the base instruction set and their semantics, in addition to common usage patterns. In the following, we show illustrative samples of the expanded instruction set. These samples are given by way of example and not by way of limitation. It is possible to refine the samples presented herein in keeping up with the spirit and goals of the present invention.

Figure 2:
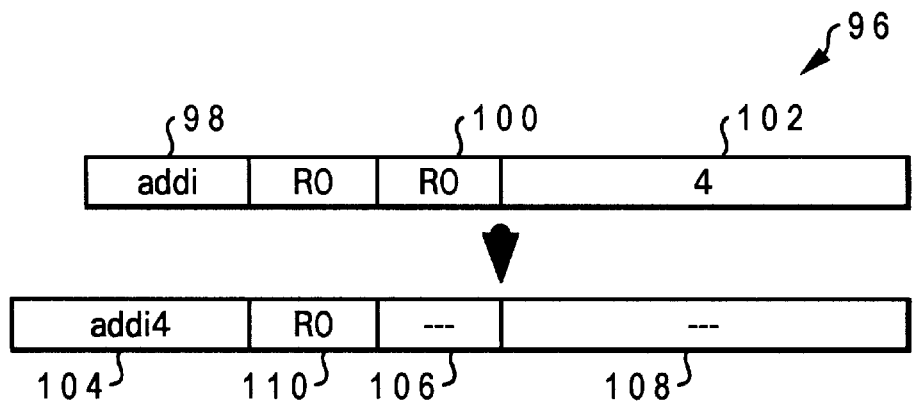
FIG. 2 shows an example of an instruction being expanded in accordance with a preferred embodiment of the invention.

Referring now to FIG. 2, there is illustrated an example of an instruction being expanded in accordance with the present invention. The example shown in FIG. 2 considers the common operation of incrementing a memory pointer. In this example, addi 98 is the opcode for add immediate instruction, RO 100 is register containing the pointer to be incremented, while the number "4" 102 is a literal that specifies the amount to be added to RO 100. A traditional compressor does not exploit any knowledge about the instruction set, and therefore will attempt to compress the various fields or the instruction itself as if it were an opaque stream of bits. According to a preferred embodiment of the present invention and in the example in FIG. 2, the instruction is expanded by replacing the opcode addi 98 with an expanded opcode 104 of an additional instruction addi4 that adds 4 to a register. The expanded opcode thus eliminates the encodings for the second register and the literal, which can now be filtered out. Other expanded instructions that follow the pattern in FIG. 2 include (but are not limited to):

Addi1, for incrementing a value in a register by 1.
Addi2, for incrementing a value in a register by 2.
Addi8, for incrementing a value in a register by 8.
Addin1, for decreasing a value in a register by 1.
Addin2, for decreasing a value in a register by 2.
Addin4, for decreasing a value in a register by 4.
Addin8, for decreasing a value in a register by 8.

In the preferred embodiment of the present invention, additional opcodes are encoded using 10 bits, original opcodes are encoded using 6 bits, registers are encoded using 5 bits each, and literals are encoded using 16 bits. The above expansion through additional instructions can thus replace a 32-bit instruction in the base instruction set with a 15-bit instruction, which will then be compressed through a traditional compressor.

As stated before, after a program is rewritten using the expanded instruction set, a filter processes the resulting instructions to eliminate fields that became redundant by the addition of expanded opcodes. In the example of FIG. 2, the $3^{rd}$ 106 and $4^{th}$ 108 fields are removed. Then, a conventional compression algorithm works on compressing the expanded opcode (the $1^{st}$ field 104) and the operand ($2^{nd}$ field 110). Because the compressor now does not have to process the $3^{rd}$ and $4^{th}$ fields, it can generate more accurate compression models that yield better compression. Furthermore, it does not need to generate code for fields that do not carry information.

Figure 3:
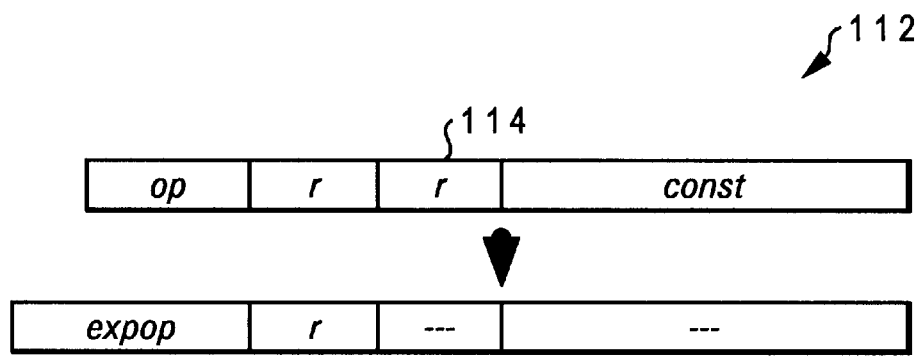
FIG. 3 illustrates an example of an instruction being expanded for operations involving constants in accordance with a preferred embodiment of the invention.

Referring now to FIG. 3, there is a generalized case for instructions of the same format depicted in FIG. 2, with the expansion eliminating the second register 114 and a literal encoding 112. As explained before, this form of expansion reduces a 32-bit instruction into a 15-bit expanded instruction.

Figure 4:
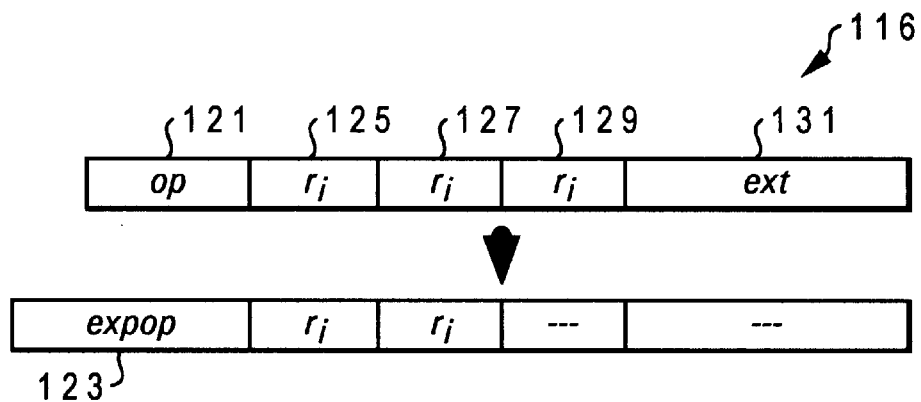
FIG. 4 illustrates an example of an instruction being expanded where a target is also one of the operands in accordance with a preferred embodiment of the invention.

Referring now to FIG. 4, there is a common instruction format 116 in the PowerPC instruction set.

This format consists of an opcode 121, an extension opcode field 131 and three register fields consisting of a target 125, a source 127, and an operand 129, and where the target 125 and operand 129 are the same, or the target 125 and the source 127 are the same. The expansion adds an additional opcode 131 and eliminates one redundant register field. This expansion results in a 20-bit expanded instruction that replaces a 32-bit instruction. The expanded instruction is later compressed using a traditional compressor as will be explained.

Figure 5:
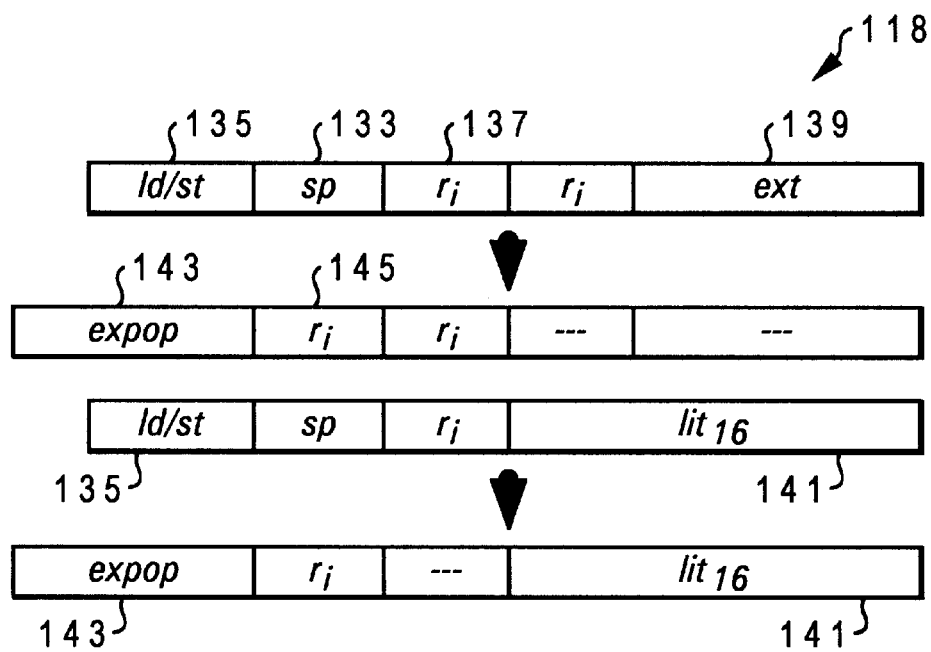
FIG. 5 illustrates an example of a load/store instruction being expanded in accordance with a preferred embodiment of the invention.

Now in reference to FIG. 5, there is an example of load/store instructions 118 that use register 133 as the stack pointer sp in the PowerPC architecture. The instruction consists of the encoding of the original opcode 135, stack pointer 133, destination or source register 137, in addition to either:

A third index register and an extension field 139.

A 16-bit literal to be used as an offset from the stack pointer 141.

In either case, the original instruction is expanded into an additional opcode 143 and a register field 145 showing the destination or source of the operation. Additionally, and according to cases (a) and (b) above, the expanded instruction also includes:

An encoding of the index register (third register of the original instruction) [case a], or An encoding of the literal (from the original instruction) [case b].

The resulting size of the expanded instruction is either 20 bits (case a), or 31 bits (case b). These will be compressed further using a traditional compressor such as a Huffman encoder.

Figure 6:
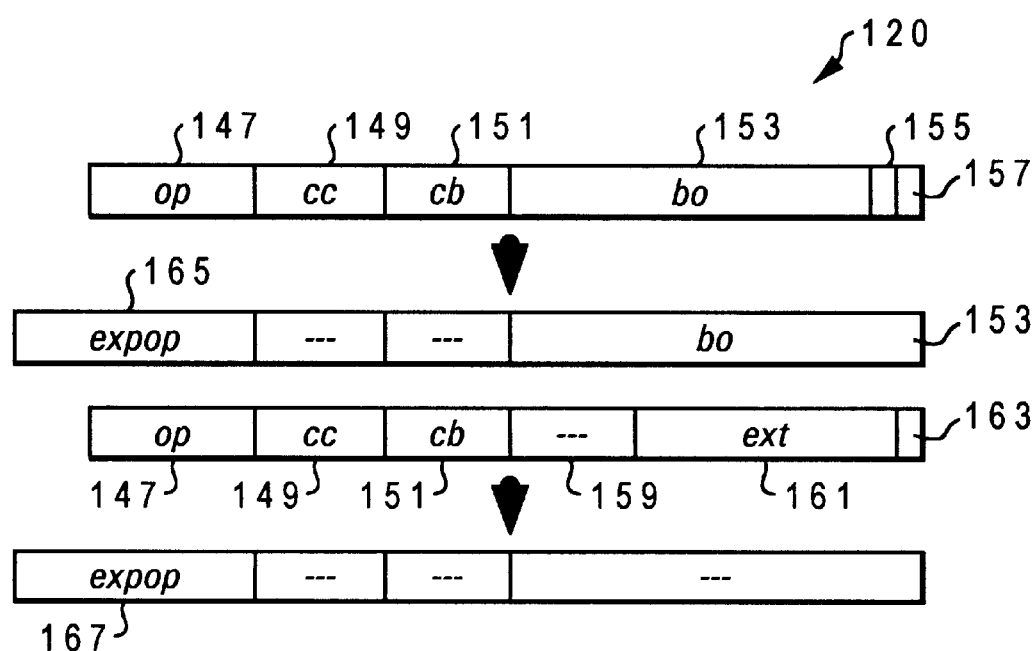
FIG. 6 illustrates an example of branch instructions being expanded in accordance with a preferred embodiment of the invention.

Now in reference to FIG. 6, there is an example instruction format 120 for conditional branch instructions in the PowerPC architecture. In one format, the instruction includes a 6-bit opcode 147, a 5-bit condition code (cc) 149, a 5-bit condition bit mask (cb) 151, a 14-bit offset (b0) 153, and two modifier bits, 155 and 157. In another format, the instruction includes a 6-bit opcode 147, a 5-bit condition code (cc) 149, a 5-bit condition bit mask (cb) 151, a 5-bit don't care field 159, a 10-bit extension field 161, and one modifier bit 163. The first format is expanded into an additional opcode 165 and the 14-bit offset 153. Thus, the expanded format of a size 20-bit replaces a 32-bit instruction. The information in cc, cb and the two modifier bits is included in the opcode encoding. The second format is expanded into an opcode 167, which encodes the entire instruction. Thus, the expanded 10-bit instruction format replaces a 32-bit instruction.

As stated before, the expanded instructions shown in the Figures are presented by way of example, but not by way of limitation. Additional refinements are possible along the spirit and goals of the present invention. The expanded codes are selected using the following criteria: an expanded instruction must encode a frequent pattern and an expanded instruction must render redundant one or more fields of the original instruction that it replaces. A tradeoff in such a design is that the expanded instruction set creates larger opcodes compared to the original instruction set. The expanded instruction set therefore must strike a balance between the expanded opcode size and the savings that result from eliminating instruction fields from the original instruction. Also, the number of expanded codes is directly proportional to the size of the opcode field in the expanded instruction set. Therefore, it is prudent to limit the number of expanded codes.

Figure 7:
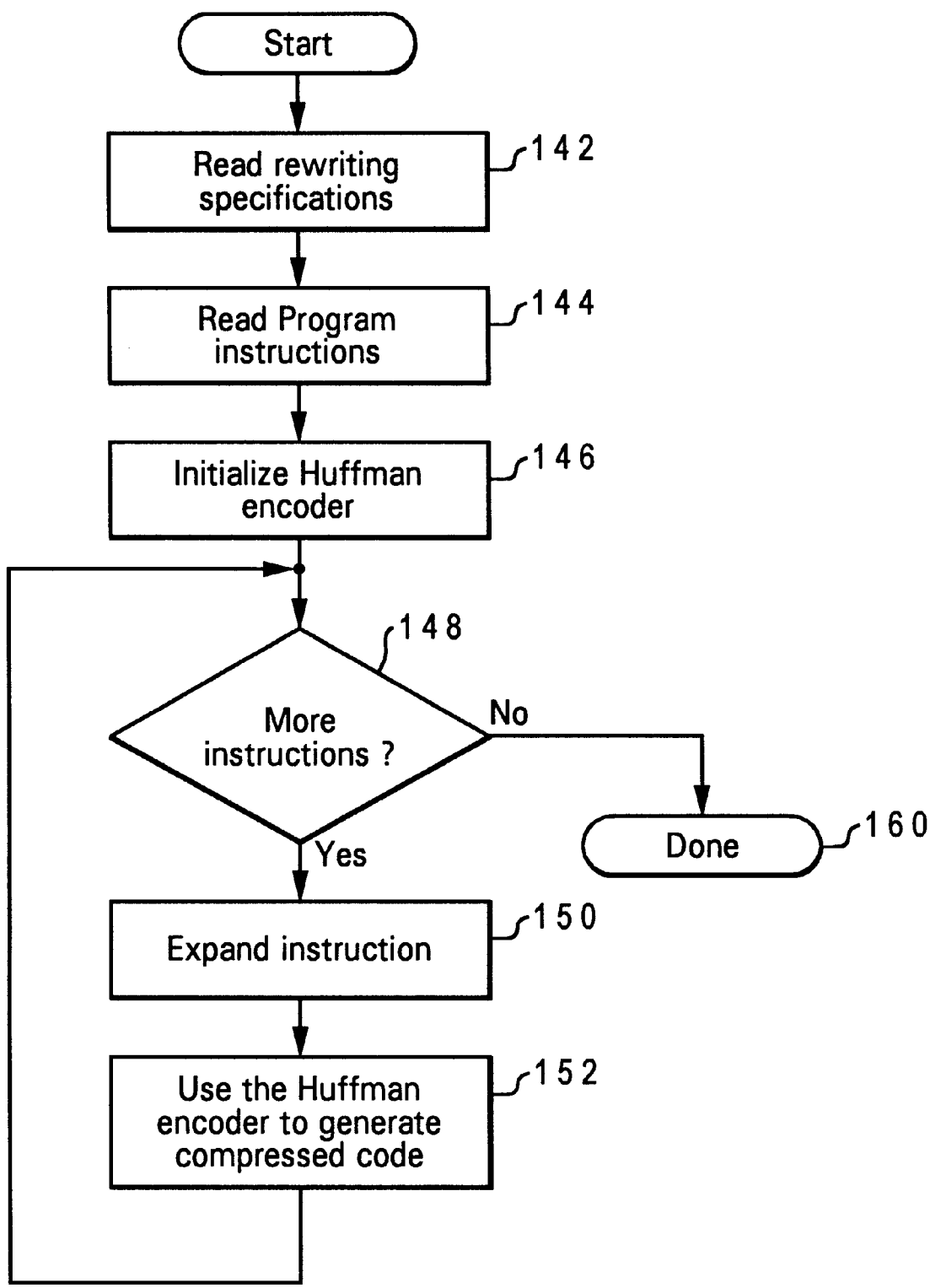
FIG. 7 is a high-level flowchart showing the steps for compression in accordance with a preferred embodiment of the invention.

In reference now to FIG. 7, there is a high level flowchart explaining how compressor 52 works. The compressor receives as input a specification for expanding instructions as described above (step 142), and an executable program to compress (step 144). Then, the compressor initializes a Huffman encoder (step 146). Such encoder could be implemented as established in the art. Additionally, other encoders could also be used, such as Ziv-Lempel. Huffman encoders, however, enable decompression to start anywhere in the middle of the code, unlike many other traditional methods. If this feature is not necessary, that is, the compressed program is to be decompressed entirely before running, then other traditional encoders could be used as well.

Once input is initialized, as shown in FIG. 7, in step 148, the compressor starts a loop in which it compresses each instruction in the program in order. The loop consists of steps 150, and 152, and continues until there are no more instructions to compress, in which case the compressor stops (step 160).

To compress each instruction, the compression first starts with expanding the instruction according to the specification, if applicable (step 150). Then, the Huffman encoder compresses the expanded instruction to generate compact code step 152.

By eliminating several redundant fields from the original instruction set through expansion, the Huffman encoder does not need to pollute its model with redundant data. Also, the Huffman encoder does not generate compressed code for redundant data. These two features improve the performance of the Huffman encoder over applying it directly over the existing (unexpanded) instruction set.

It is also important to note that although the present invention has been described in the context of a hardware compressor, those skilled in the art will appreciate that the mechanisms of the present invention can be implemented in software and be distributed as a program product in a variety of forms, and that the present invention applies equally regardless of the particular type of signal bearing media utilized to actually carry out the distribution. Examples of signal bearing media include but are not limited to recordable type media such as floppy disks or CD ROMs, and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for code compression in a reduced instruction set computer (RISC) for executable code, said method comprising the steps of:

expanding a RISC instruction set to facilitate removal of redundant fields;

rewriting executable code using said expanded RISC instruction set;

applying a filter to remove redundant fields of said rewritten executable; and applying conventional compression techniques to said filtered rewritten executable code.

2. The method for code compression in a reduced instruction set computer (RISC) for executable code according to claim 1, wherein expanding said RISC instruction set further comprises the step of:

adding opcodes to produce code that facilitates the removal of redundant fields.

3. The method for code compression in a reduced instruction set computer (RISC) for executable code according to claim 1, wherein expanding said RISC instruction set further comprises the step of:

selecting expanded instructions that exhibit a frequent habit.

4. The method for code compression in a reduced instruction set computer (RISC) for executable code according to claim 1, wherein expanding said RISC instruction set further comprises the step of:

selecting expanded instructions which render redundant one or more fields of an original instruction it replaces.

5. The method for code compression in a reduced instruction set computer (RISC) for executable code according to claim 1, wherein expanding said RISC instruction set further comprises the step of:

striking a balance between expanded opcode size and savings that result from eliminating instruction from an original instruction.

6. The method for code compression in a reduced instruction set computer (RISC) for executable code according to claim 1, wherein applying conventional compression techniques further comprises the step of:

applying Huffman encoding.

7. The method for code compression in a reduced instruction set computer (RISC) for executable code according to claim 1, wherein expanding said RISC instruction set further comprises the step of:

determining the number of expanded codes based on size of opcode fields in said expanded instruction set.

8. The method for code compression in a reduced instruction set computer (RISC) for executable code according to claim 1, wherein expanding said RISC instruction set further comprises the step of:
   determining tradeoffs between size of said expanded instruction set when creating larger opcodes and size of original instruction set.

9. An information handling system, comprising:
   means for expanding a RISC instruction set to facilitate removal of redundant fields;
   means for rewriting executable code using said expanded RISC instruction set;
   means for applying a filter to remove redundant fields of said rewritten executable code; and
   means for applying conventional compression techniques to said filtered rewritten executable code.

10. An information handling system according to claim 9, comprising:
    means for adding opcodes to produce code that facilitates the removal of redundant fields.

11. An information handling system according to claim 9, comprising:
    means for selecting expanded instructions that exhibit a frequent habit.

12. An information handling system according to claim 9, comprising:
    means for selecting expanded instructions which render redundant one or more fields of an original instruction it replaces.

13. An information handling system according to claim 9, comprising:
    means for striking a balance between expanded opcode size and savings that result from eliminating instruction from an original instruction.

14. An information handling system according to claim 9, comprising:
    means for applying Huffman encoding.

15. An information handling system according to claim 9, comprising:
    means for determining tradeoffs between size of said expanded instruction set when creating larger opcodes and size of original instruction set.

16. A computer product residing on a computer usable medium for code compression in a reduced instruction set computer (RISC) within an information handling system, comprising:
    instruction means for expanding a RISC instruction set to facilitate removal of redundant fields;
    instruction means for rewriting executable code using said expanded RISC instruction set;
    instruction means for applying a filter to remove redundant fields of said rewritten executable code; and
    instruction means for applying conventional compression techniques to said rewritten executable code.

17. The computer program product according to claim 16, comprising:
    instruction means for adding opcodes to produce code that facilitates the removal of redundant fields.

18. The computer program product according to claim 16, comprising:
    instruction means for selecting expanded instructions that exhibit a frequent habit.

19. The computer program product according to claim 16, comprising:
    instruction means for selecting expanded instructions which render redundant one or more fields of an original instruction it replaces.

20. The computer program product according to claim 16, comprising:
    instruction means for striking a balance between expanded opcode size and savings that result from eliminating instruction from an original instruction.

* * * * *